(12) United States Patent
Li et al.

(10) Patent No.: US 11,567,502 B2
(45) Date of Patent: Jan. 31, 2023

(54) AUTONOMOUS EXPLORATION FRAMEWORK FOR INDOOR MOBILE ROBOTICS USING REDUCED APPROXIMATED GENERALIZED VORONOI GRAPH

(71) Applicant: Wuhan University, Wuhan (CN)

(72) Inventors: Lin Li, Wuhan (CN); Xinkai Zuo, Wuhan (CN); Haihong Zhu, Wuhan (CN); Shen Ying, Wuhan (CN); Fan Yang, Wuhan (CN); Fei Su, Wuhan (CN); Yifan Liang, Wuhan (CN); Gang Zhou, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 298 days.

(21) Appl. No.: 16/994,702

(22) Filed: Aug. 17, 2020

(65) Prior Publication Data
US 2021/0109537 A1   Apr. 15, 2021

(30) Foreign Application Priority Data

Oct. 9, 2019   (CN) .......................... 201910951962.8

(51) Int. Cl.
  *G05D 1/02*   (2020.01)
(52) U.S. Cl.
  CPC .......... *G05D 1/0214* (2013.01); *G05D 1/024* (2013.01); *G05D 1/0221* (2013.01); *G05D 1/0253* (2013.01); *G05D 1/0257* (2013.01)
(58) Field of Classification Search
  CPC .... G05D 1/0214; G05D 1/0221; G05D 1/024; G05D 1/0253
  See application file for complete search history.

(56) References Cited

U.S. PATENT DOCUMENTS

| 2019/0220020 A1* | 7/2019 | Macias | ................ G01C 21/206 |
| 2021/0018929 A1* | 1/2021 | Choi | .................... G05D 1/0246 |

FOREIGN PATENT DOCUMENTS

| CN | 101413806 A | * | 4/2009 | |
| CN | 107066507 B | * | 9/2019 | ............. G06F 16/29 |

OTHER PUBLICATIONS

Extraction of a Topological Representation based on Raw Data using Voronoi Diagram, Galli et al, May 2018 (hereinafter referred to as Galli) (Year: 2018).*
CN107066507B—English Trans (Year: 2019).*
CN101413806A—English Trans (Year: 2009).*

* cited by examiner

*Primary Examiner* — Abby Y Lin
*Assistant Examiner* — Renee LaRose
(74) *Attorney, Agent, or Firm* — Matthias Scholl P.C.; Matthias Scholl (57) ABSTRACT

An autonomous robotic exploration method based on a reduced approximated generalized Voronoi graph, the method including: 1) constructing a reduced approximated generalized Voronoi topological map based on a morphological method; 2) obtaining an Next-Best-View and planning a global path from the robot to the Next-Best-View; and 3) navigating to the Next-Best-View along the global path $R=\{r_0, r_1, r_2, \ldots, p_{NBV}\}$ based on a visual force field (VFF) algorithm.

4 Claims, 8 Drawing Sheets

AUTONOMOUS EXPLORATION FRAMEWORK FOR INDOOR MOBILE ROBOTICS USING REDUCED APPROXIMATED GENERALIZED VORONOI GRAPH

CROSS-REFERENCE TO RELATED APPLICATIONS

Pursuant to 35 U.S.C. § 119 and the Paris Convention Treaty, this application claims foreign priority to Chinese Patent Application No. 201910951962.8 filed Oct. 9, 2019, the contents of which, including any intervening amendments thereto, are incorporated herein by reference.

BACKGROUND

The disclosure relates to the field of automation technology, and more particularly relates to an autonomous robotic exploration method based on a Reduced Approximated Generalized Voronoi Graph.

Due to complexity and structured features of indoor spaces, mobile robots can be widely used in tasks related to architectural survey (such as indoor surveying and mapping, and indoor search and rescue). Therefore, performing autonomous exploration and movement in an unexplored space becomes one of the research hotspots of robot technology. The autonomous exploration technology may enable a robot to move in an unexplored environment and perceive an unknown object in the environment by various sensors carried on the robot, so as to complete a given specific task. According to the existing researches there are four main difficulties in this topic: (I) how to perform modeling for an environment; (II) how to decide where the robot go next; (III) how to find a global path connecting any two locations in a passable space; (IV) how to control the robot to track a path and avoid obstacles in real time.

Figure 2:
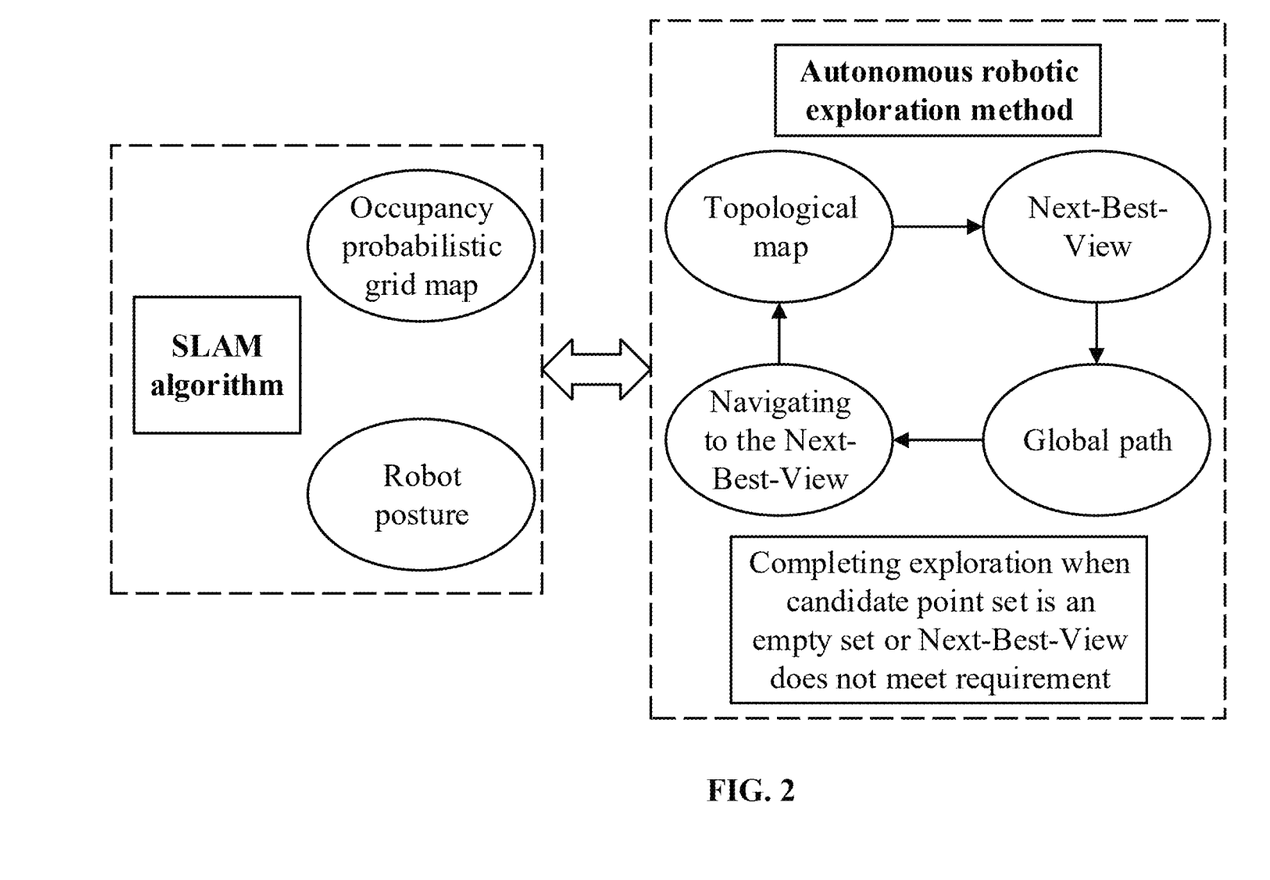
FIG. 2 illustrates a main flow of an autonomous exploration method based on a Next-Best-View according to an example of the disclosure.

At present, some feasible methods are successfully implemented in simulation experiments and real robots, where frontier-based methods have already achieved a good effect. Frontiers are distributed at a junction of an explored region and an unexplored region. Usually, the robot is very likely to obtain more environmental information at the frontiers. The frontier-based method is as shown in FIG. 2. A SLAM algorithm as background art provides an environmental occupancy probabilistic grid map and a robot pose. In each step of exploration, a series of candidate frontiers may be obtained by processing the environmental map, and the optimal candidate point can be obtained by performing feature calculation and comparison for these candidate frontiers, one global path from a current location of the robot to the optimal candidate point can be found in the environmental map based on a path planning algorithm (for example, A* algorithm), and finally, the robot is navigated to the optimal candidate point along the path. At this time, exploration is completed. Then, the next step of exploration begins by searching the candidate frontiers again until no candidate frontier is obtained or the Next-Best-View is not satisfactory. At this time, the autonomous exploration is ended.

However, some problems still exist in the frontier-based method at present. One problem is as follows: a large number of candidate frontiers are generated, resulting in a considerable redundancy, so that performing feature calculation and comparison for the candidate frontiers will take a lot of calculation time. The second problem is as follows: a path searching algorithm on the grid map cannot satisfy a real-time requirement, and the path is often close to a wall, bringing about a collision risk to the mobile robot. Some scholars propose to perform modeling for the environment by directly using a topological map so as to effectively reduce the number of candidate frontiers and accelerate a path planning speed. However, the environmental information carried on the topological map is in severe shortage, so that it is difficult to effectively perform the feature calculation and comparison for the candidate frontiers.

SUMMARY

One object of the disclosure is to provide a method by which a mobile robot is allowed to explore an entire space rapidly, safely, steadily and completely in an unknown indoor environment by improving a reduced approximated generalized Voronoi graph and utilizing its features.

To achieve the above object, the disclosure provides an autonomous robotic exploration method based on a reduced approximated generalized Voronoi graph, the method comprising:

1) constructing a reduced approximated generalized Voronoi topological map based on a morphological method, which comprises:

1.1) performing threshold extraction for an occupancy probabilistic grid map, extracting pixels with a gray scale smaller than an empirical threshold $th_{obstacle}$ as an obstacle region, the $th_{obstacle}$ being 50-70; and extracting pixels with a gray scale greater than an empirical threshold $th_{free}$ as a passable region, and the $th_{free}$ being 200-220;

1.2) performing small-gap filling for the obstacle region and the passable region generated in 1.1) by using a morphological closing operation, removing a pixel block with the number of pixels smaller than an empirical threshold $th_{conn}$, based on a connectivity analysis, and determining a value of the $th_{conn}$ according to a resolution and an application requirement of the occupancy probabilistic grid map; obtaining a smooth obstacle region and a smooth passable region by removing a convex part of a boundary of the pixel block based on smoothing filtering;

1.3) obtaining the reduced approximated generalized Voronoi diagram by performing center line extraction for the smooth passable region in 1.2) based on an image thinning algorithm; and 1.4) performing topologization for the reduced approximated generalized Voronoi graph obtained in 1.3), extracting a node set V in the reduced approximated generalized Voronoi graph by adopting a neighborhood analysis, obtaining edges E connecting these nodes based on a flood-fill algorithm, and recording edge lengths in a distance matrix $M_{dist}$, to obtain a topological map $G=\{V, E, M_{dist}\}$ of the passable region;

2) obtaining a Next-Best-View and planning a global path from the robot to the Next-Best-View, which comprises:

2.1) obtaining an edge e closest to a current location of the robot and two nodes $v_e^1$ and $v_e^2$ of the e in the topological map G by taking all leaf nodes $V_{leaf}$ in the topological map G as initial candidate frontiers, and querying two paths $R_1=\{v_e^1, r_0^1, r_1^1, r_2^1, \ldots, p\}$ and $R_2=\{v_e^2, r_0^2, r_1^2, r_2^2, \ldots, p\}$ from each candidate point p to the $v_e^1$ and the $v_e^2$ respectively in the topological map based on a Dijkstra algorithm;

2.2) performing curve simplification for the two paths obtained in 2.1) based on a Douglas-Pucker algorithm, then calculating lengths of two simplified paths as $D(p, v_e^1)$ and $D(p, v_e^2)$ respectively, selecting a minimum value as a distance $D(p)=\min\{D(p, D(p, v_e^2)\}$ from the p to the robot, and calculating a sum T(p) of turning angles of a path corresponding to the distance;

2.3) calculating an estimate A(p) of a potential environmental information gain of each candidate point p in the occupancy probabilistic grid map, and calculating a perception degree C(p) of a sensor of the candidate point;

2.4) performing normalization for four feature values D(p), T(p), A(p) and C(p) of the candidate point calculated in 2.2) and 2.3), obtaining a candidate point set P candidate by excluding the candidate points with extremely low scores based on a low threshold, and completing the exploration when the candidate point set is an empty set; and 2.5) evaluating each candidate point in the candidate point set $P_{candidate}$ by a Multi-Criteria-Decision-Making approach based on a fuzzy measure function, taking the candidate point with the highest score as the Next-Best-View $p_{NBV}$, and obtaining the global path R={$r_0, r_1, r_2, \ldots, p_{NBV}$} from the current location of the robot to the Next-Best-View by tracing back in the result of in 2.2); and 3) navigating to the Next-Best-View along the global path R={$r_0, r_1, r_2, \ldots, p_{NBV}$} based on a visual force field (VFF) algorithm, which comprises:

3.1) letting a current navigation target point be $r_0$, performing motion planning in real time according to laser sensor data based on the VFF algorithm, transmitting motion planning instructions to the robot, so that the robot starts to move toward the current navigation target point $r_0$ until the robot reaches $r_0$;

3.2) when the robot reaches a critical point $r_i$ in the global path, letting the current navigation target point be $r_{i+1}$, performing motion planning in real time based on the VFF algorithm, so that the robot continues moving to the $r_{i+1}$ until the robot reaches the Next-Best-View $p_{NBV}$; and 3.3) returning to 1), and starting to query the next Next-Best-View for the next stage of exploration.

The sum T(p) of the turning angles in 2.2) is calculated based on the following formula:

$$T(p) = \sum_{i=1}^{M-2} \theta_i$$

wherein $\theta_i = \pi - \angle D_{i-1} D_i D_{i+1}$, which refers to a degree of the i-th turning angle.

The perception degree C(p) of the sensor in 2.3) is calculated based on the following formulas $$x_{uc} = \operatorname{argmin}_{x \in UC} Dist(p, x),$$
$$x_c = \operatorname{argmin}_{x \in C} Dist(p, x), \text{ and}$$
$$C(p) = \begin{cases} -Dist(p, x_{uc}), & \text{if } p \in C \\ Dist(p, x_u), & \text{if } p \in UC \end{cases},$$

wherein a set UC refers to a region undetected by another sensor, a set C refers to a region already detected by another sensor, $x_{uc}$ refers to a pixel point that is closest to the candidate point p and undetected by another sensor, and $x_c$ refers to a point that is closest to the candidate point p and already detected by another sensor.

The normalization in 2.4) is performed for the four feature values D(p), T(p), A(p) and C(p) of the candidate point based on the following formulas:

$$u_A(p) = \frac{A(p) - \min_{q \in CP} A(q)}{\max_{q \in CP} A(q) - \min_{q \in CP} A(q)},$$

$$u_D(p) = 1 - \frac{D(p) - \min_{q \in CP} D(q)}{\max_{q \in CP} D(q) - \min_{q \in CP} D(q)},$$

$$u_T(p) = 1 - \frac{T(p) - \min_{q \in CP} T(q)}{\max_{q \in CP} T(q) - \min_{q \in CP} T(q)} \text{ and}$$

$$u_C(p) = \frac{C(p) - \min_{q \in CP} C(q)}{\max_{q \in CP} C(q) - \min_{q \in CP} C(q)}.$$

2.5) involves the following formula:

$$F(p) = \sum_{j=1}^{n} (u_j(p) - u_{j-1}(p)) \mu(A_j),$$

wherein a sub-set $Aj \subset F$ is defined as $Aj = \{F_m, m \in N | u_j(p) \leq u_m(p) \leq u_n(p)\}$, $\mu$ a normalized fuzzy metric function used for defining a weight of a group of features, and feature score vector sequences of the candidate points p are sorted in an ascending order according to normalized numerical values of the candidate points, that is, $0 = u_0(p) \leq u_1(p) \leq u_2(p) \leq \ldots \leq u_n(p) \leq 1$.

The disclosure has the following beneficial effects. In the disclosure, a frontier point decision problem and a path planning problem in autonomous robotic exploration are converted from a two-dimensional grid map into a topological map. In the method, the reduced approximated generalized Voronoi graph of the occupancy probabilistic grid map is generated as the topological map of the explored region through a series of image processing technologies based on a two-dimensional laser Simultaneous Localization and Mapping (SLAM) technology. The topological map can express connectivity and reachability of the entire explored region with fewer nodes and edges. By fully utilizing the features of the reduced approximated generalized Voronoi graph, the method is applied to an indoor autonomous exploration task of the mobile robot, thereby greatly reducing the number of candidate frontiers, and decreasing a calculation amount of the path planning. At the same time, it is ensured that the generated global path is an optimal collision-free path. Compared with other methods, the method of the disclosure can enable the indoor autonomous robotic exploration to be faster, the reduced approximated generalized Voronoi graph is more flexible in a specific application, and requirements of the autonomous exploration task of the mobile robot are satisfied better.

DETAILED DESCRIPTION OF THE EMBODIMENTS

To further illustrate, embodiments detailing an autonomous robotic exploration method based on a reduced approximated generalized Voronoi graph are described below. It should be noted that the following embodiments are intended to describe and not to limit the disclosure.

Figure 1:
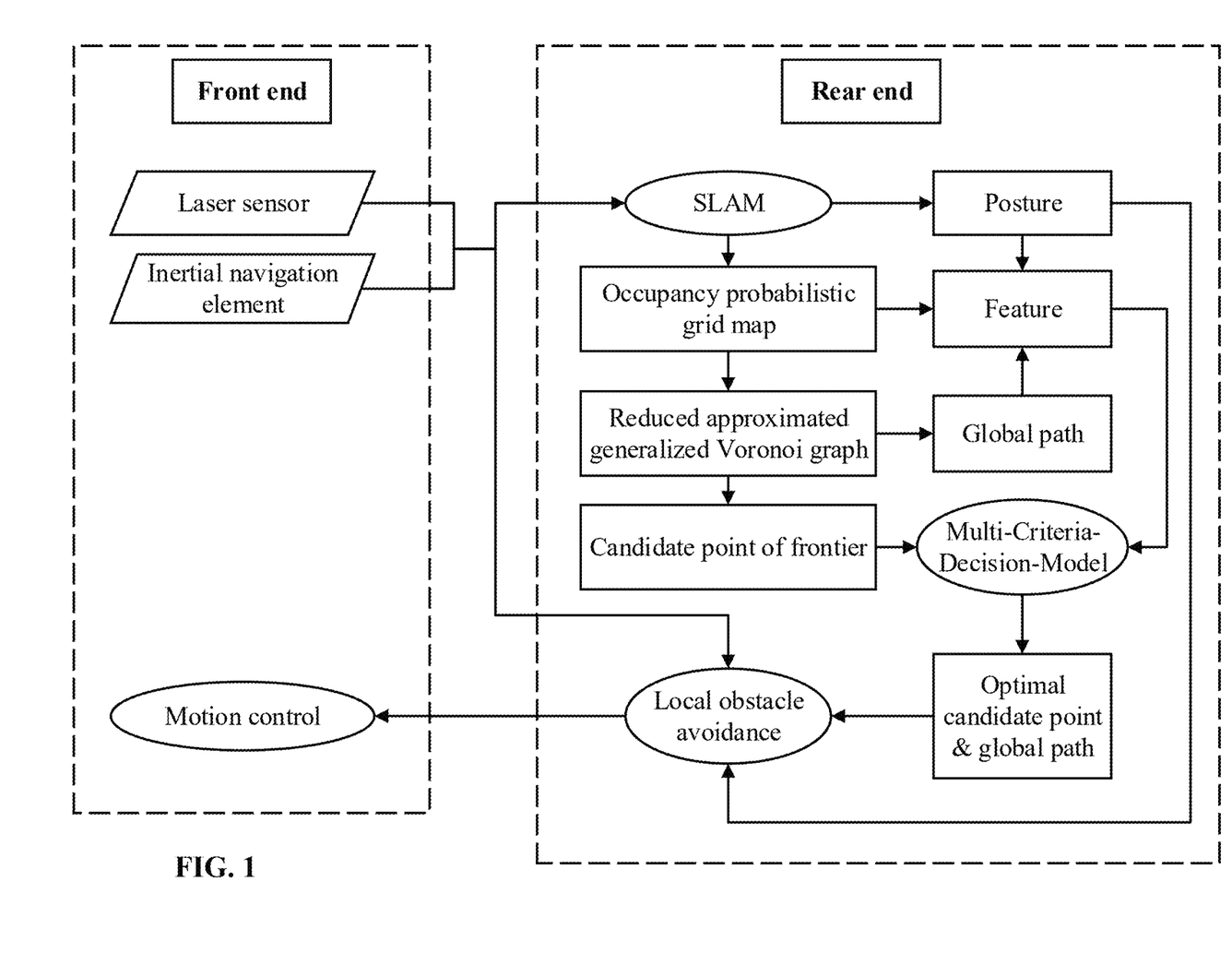
FIG. 1 is a flowchart illustrating indoor autonomous robotic exploration according to an example of the disclosure.

An example of the disclosure provides an autonomous exploration method of a mobile robot applicable to an indoor scenario. The indoor autonomous exploration method of the mobile robot is designed and implemented by generating a topological map from an occupancy probabilistic grid map and combining respective advantages of two environmental maps. The example is implemented through the following technical solution: an Next-Best-View is obtained by constructing a reduced approximated generalized Voronoi topological map based on a morphological method, a global path from a current location of the robot to the Next-Best-View is planned, and the robot is navigated to the Next-Best-View along the global path R={$r_0$, $r_1$, $r_2$, . . . , $p_{NBV}$}, as shown in FIG. 1. By fully utilizing the features of the reduced approximated generalized Voronoi graph, the method is applied to the indoor autonomous exploration task of the mobile robot, and the autonomous exploration problem is converted from a two-dimensional plane space into a topological map space, thereby greatly reducing the number of candidate frontiers, and decreasing the calculation amount of the path planning. Further, it is ensured that the generated global path is the optimal collision-free path at the same time. Compared with other methods, the method of the disclosure can enable the indoor autonomous robotic exploration to be faster, the reduced approximated generalized Voronoi graph is more flexible in the specific application, and the requirements of the autonomous exploration task of the mobile robot is satisfied better.

In a specific implementation, an autonomous robotic exploration method based on a reduced approximated generalized Voronoi graph is applicable to tasks such as indoor surveying and indoor search and rescue of the mobile robot in an unknown indoor space. The method includes the following blocks.

Figure 3:
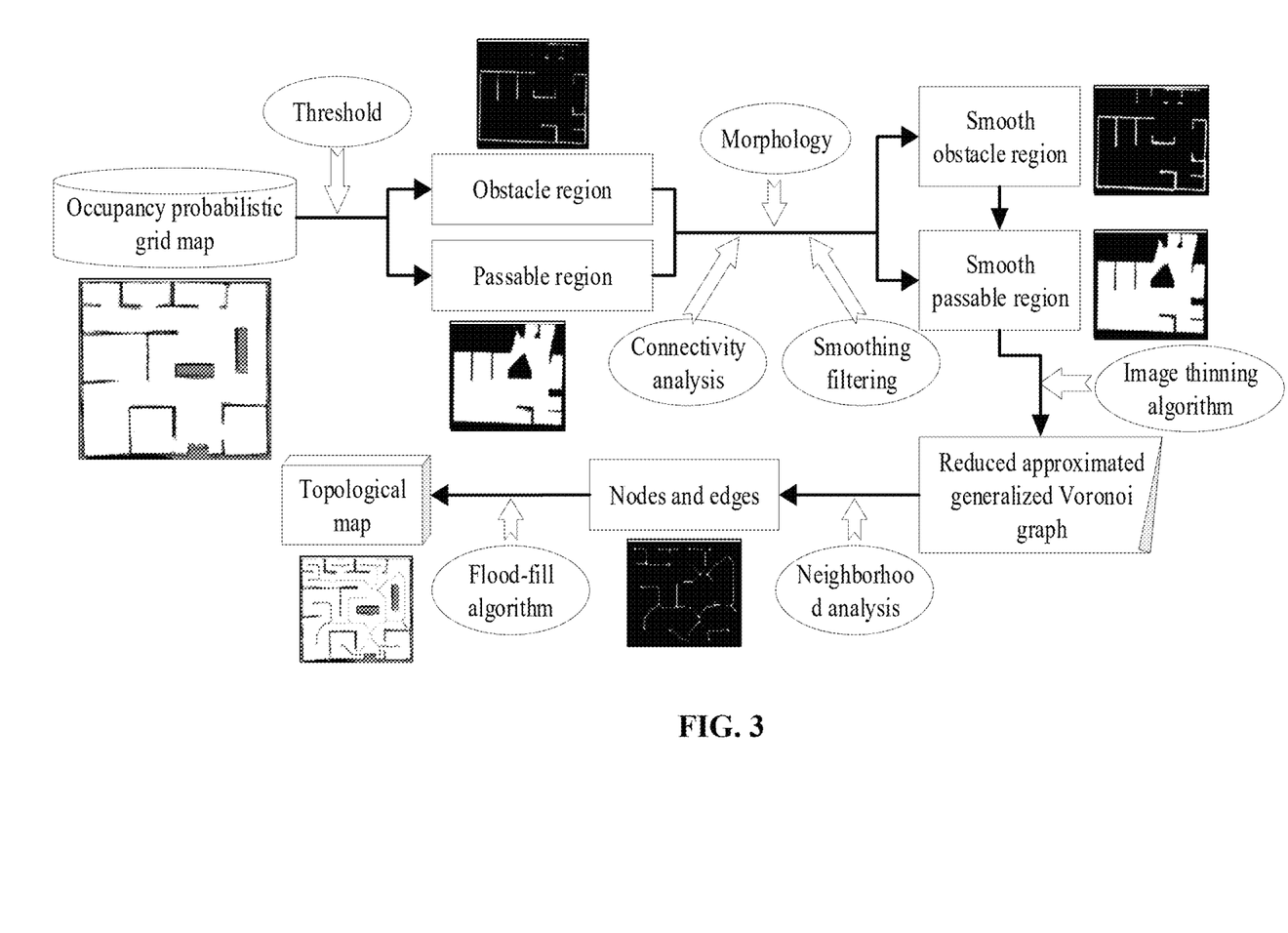
FIG. 3 illustrates a main flow of constructing an environmental topological map from an occupancy probabilistic grid map based on a reduced approximated generalized Voronoi graph according to an example of the disclosure.

At block S1, a reduced approximated generalized Voronoi topological map is constructed based on a morphological method as shown in FIG. 3, which includes the following sub-blocks.

Figure 4A:
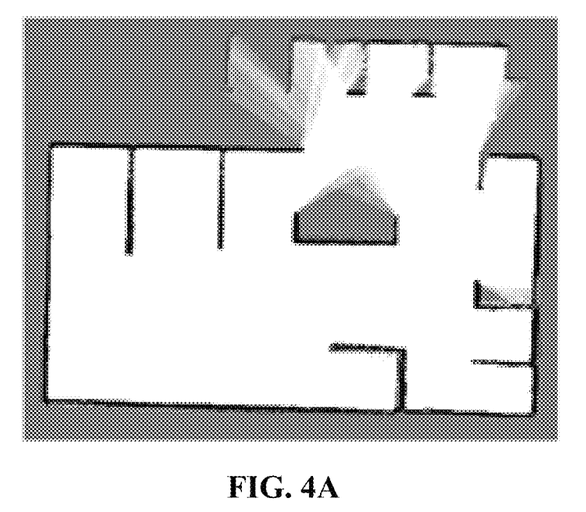
FIG. 4A is an occupancy probabilistic grid map according to an example of the disclosure.

At sub-block S1.1, threshold extraction is performed for an occupancy probabilistic grid map as shown in FIG. 4A, where pixels with a gray scales smaller than an empirical threshold $th_{obstacle}$ are extracted as an obstacle region, and the $th_{obstacle}$ usually is 50-70; and pixels with a gray scale greater than an empirical value $th_{free}$ are extracted as a passable region, and the $th_{free}$ usually is 200-220.

Figure 4B:
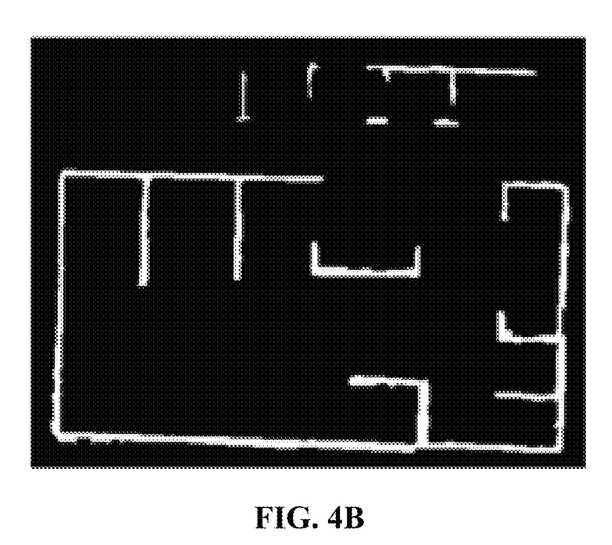
FIG. 4B is a schematic diagram illustrating a smooth obstacle region according to an example of the disclosure.
Figure 4C:
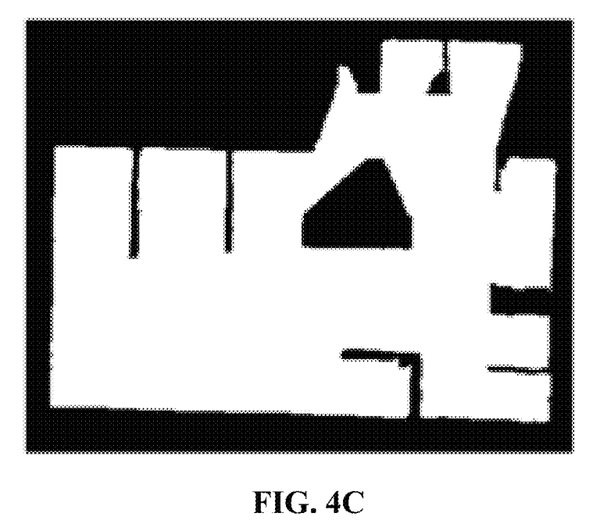
FIG. 4C is a schematic diagram illustrating a smooth passable region according to an example of the disclosure.

At sub-block S1.2, small-gap filling is performed for the obstacle region and the passable region generated at the above sub-block S1.1 by using a morphological closing operation, a pixel block with the number of pixels smaller than an empirical threshold $th_{conn}$ is removed based on a connectivity analysis, and the $th_{conn}$ is determined according to a resolution and an application requirement of the occupancy probabilistic grid map. In this example, one pixel of the occupancy probabilistic grid map represents a region of 0.05 m×0.05 m, and the $th_{conn}$ is 40. A convex part of a pixel block boundary is removed by smoothing filtering, so that a smooth obstacle region as shown in FIG. 4B and a smooth passable region as shown in FIG. 4C are obtained.

At sub-block S1.3, the reduced approximated generalized Voronoi diagram is obtained by performing center line extraction for the smooth passable region at sub-block S1.2 based on an image thinning algorithm of eroding edge pixels, where the Voronoi diagram is in the form of a continuous network graph with a width being 1 on a grid image.

Figure 5:
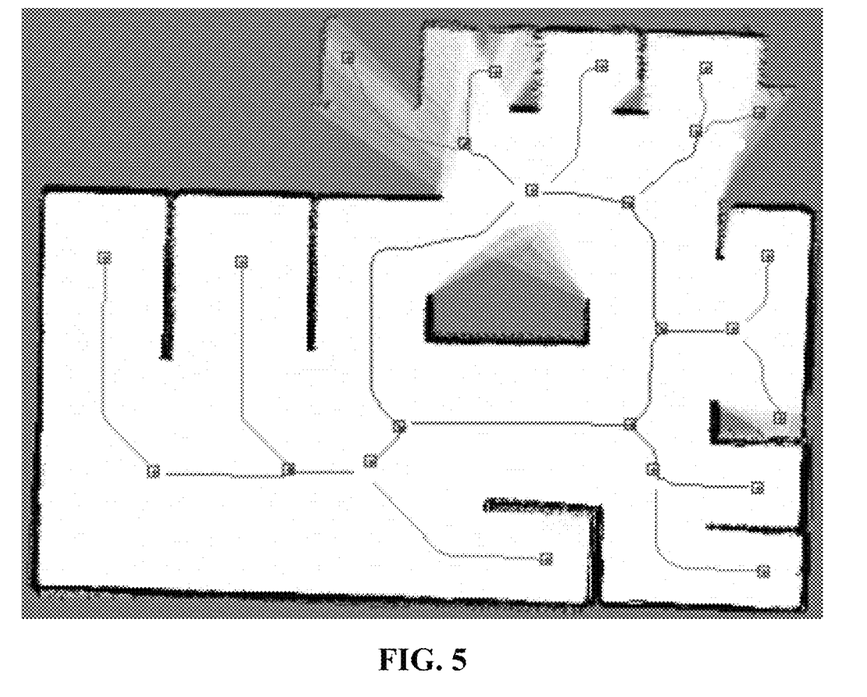
FIG. 5 is an environmental topological map based on a reduced approximated generalized Voronoi graph according to an example of the disclosure.

At sub-block S1.4, topologization is performed for the reduced approximated generalized Voronoi graph obtained at sub-block S1.3, a node set V in the reduced approximated generalized Voronoi graph is extracted by adopting a neighborhood analysis, edges E connecting these nodes are obtained based on a flood-fill algorithm, and edge lengths are recorded in a distance matrix $M_{dist}$, to obtain a topological map G={V, E, $M_{dist}$} of the passable region as shown in FIG. 5.

At block S2, a Next-Best-View is obtained, and a global path from the robot to the Next-Best-View is planned, where the block S2 includes the following sub-blocks.

At sub-block S2.1, all leaf nodes $V_{leaf}$ in the topological map G are taken as initial candidate frontiers, an edge e closest to the current location of the robot and two nodes $v_e^1$ and $v_e^2$ of the edge e in the G are obtained, and two paths $R_1$={$v_e^1$, $r_0^1$, $r_1^1$, $r_2^1$, . . . , p} and $R_2$={$v_e^2$, $r_0^2$, $r_1^2$, $r_2^2$, . . . , p} from each candidate point p to the $v_e^1$ and the $v_e^2$ are queried respectively in the topological map based on a Dijkstra algorithm.

Figure 6A:
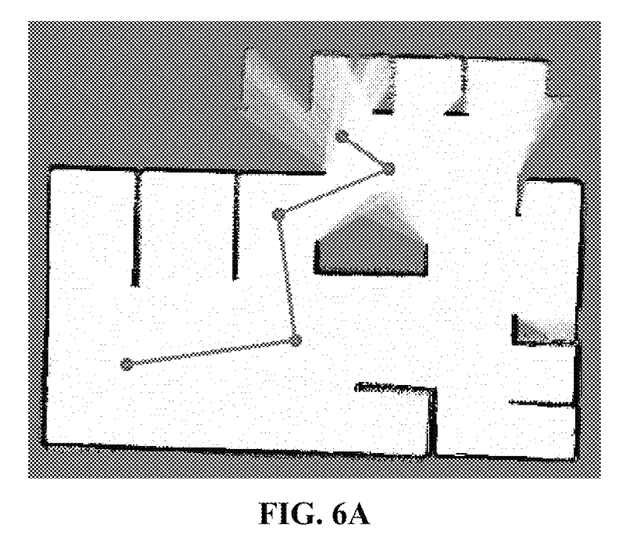
FIG. 6A is a schematic diagram illustrating a global path calculation method according to an example of the disclosure.
Figure 6B:
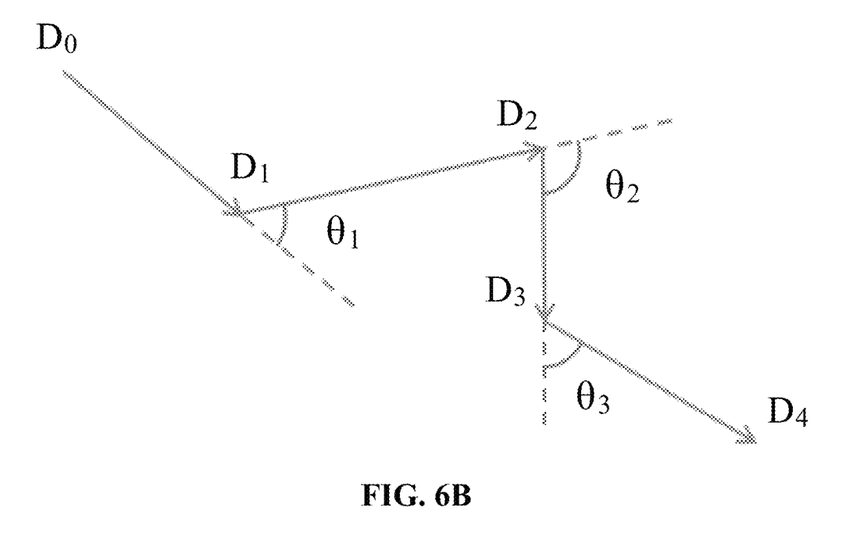
FIG. 6B is a schematic diagram illustrating a path curvature calculation method according to an example of the disclosure.

At sub-block S2.2, curve simplification is performed for two paths obtained at sub-block S2.1 based on a Douglas-Pucker algorithm, and lengths of two simplified paths are then calculated as D(p, $v_e^1$) and D(p, $v_e^2$) respectively, as shown in FIG. 6A; a minimum value is taken as a distance D(p)=min{D(p, $v_e^1$),D(p, $v_e^2$)} from the p to the robot, and a sum T(p) of turning angles of a path corresponding to the distance is calculated as shown in FIG. 6B and the calculation may be performed based on the following formula:

$$T(p)=\Sigma_{i=1}^{M-2}\theta_i.$$

In the above formula, $\theta_i=\pi-\angle D_{i-1}D_iD_{i+1}$, which refers to a degree of the i-th turning angle.

Figure 7A:
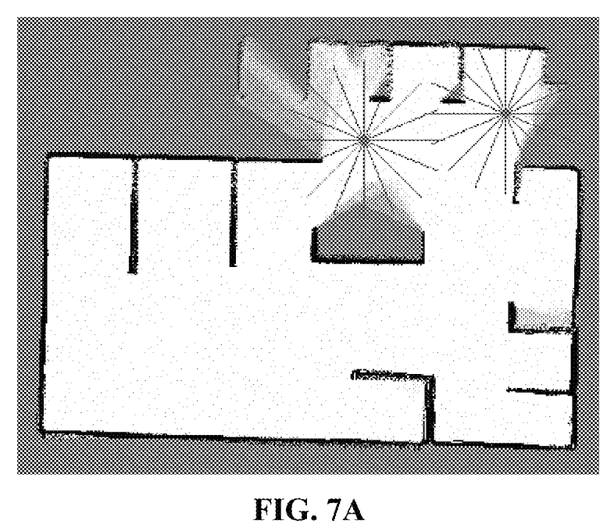
FIG. 7A is a schematic diagram of calculating an estimate A(p) of a potential environmental information gain of each candidate point p by a ray casting method according to an example of the disclosure.
Figure 7B:
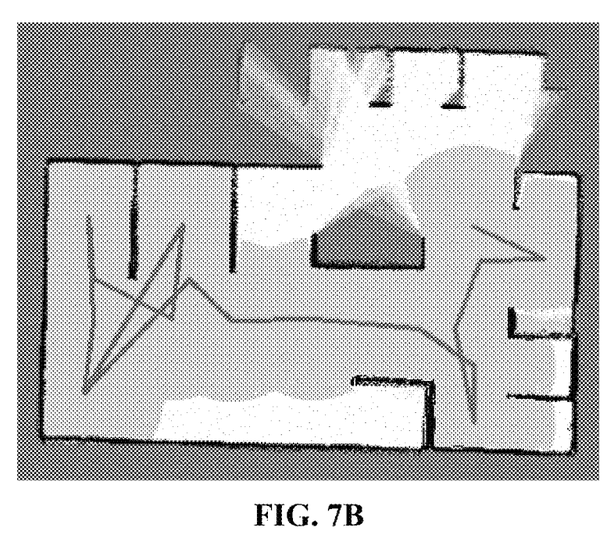
FIG. 7B is a schematic diagram illustrating a coverage of another sensor carried by a robot and calculating a perception degree C(p) of the sensor of the robot according to an example of the disclosure.

At sub-block S2.3, an estimate A(p) of a potential environmental information gain of each candidate point p is calculated in the occupancy probabilistic grid map by a ray casting method as shown in FIG. 7A, and FIG. 7B illustrates a coverage of another sensor (such as a panorama camera, a laser radar and a bio-detector) carried by the robot and a perception degree C(p) of the sensor of the robot calculated based on the following formulas.

$$x_{uc} = \text{argmin}_{x \in UC} \, Dist(p, x)$$

$$x_c = \text{argmin}_{x \in C} \, Dist(p, x)$$

$$C(p) = \begin{cases} -Dist(p, x_{uc}), & \text{if } p \in C \\ Dist(p, x_u), & \text{if } p \in UC \end{cases}$$

In the above formulas, a set UC refers to a region undetected by another sensor, a set C refers to a region already detected by another sensor, $x_{uc}$ refers to a pixel point that is closest to the candidate point p and undetected by another sensor, and $x_c$ refers to a point that is closest to the candidate point p and already detected by another sensor.

At sub-block S2.4, a feature score vector U $(p_i)=(u_1(p_i), u_2(p_i), \ldots, u_n(p_i))$ of the candidate point is constructed by performing, based on the following formulas, normalization for four feature values D(p), T(p), A(p) and C(p) of the candidate points calculated at sub-blocks S2.2 and S2.3, a candidate point set $P_{candidate}$ is obtained by excluding the candidate points with extremely low scores based on a low threshold. The exploration is completed if the candidate point set is an empty set.

$$u_A(p) = \frac{A(p) - \min_{q \in CP} A(q)}{\max_{q \in CP} A(q) - \min_{q \in CP} A(q)}$$

$$u_D(p) = 1 - \frac{D(p) - \min_{q \in CP} D(q)}{\max_{q \in CP} D(q) - \min_{q \in CP} D(q)}$$

$$u_T(p) = 1 - \frac{T(p) - \min_{q \in CP} T(q)}{\max_{q \in CP} T(q) - \min_{q \in CP} T(q)}$$

$$u_C(p) = \frac{C(p) - \min_{q \in CP} C(q)}{\max_{q \in CP} C(q) - \min_{q \in CP} C(q)}$$

At sub-block S2.5, each candidate point in the candidate point set P candidate is evaluated based on the following formula by a Multi-Criteria-Decision-Making approach based on a fuzzy measure function, the candidate point with the highest score is the Next-Best-View $p_{NBV}$, and the global path R={$r_0, r_1, r_2, \ldots, r_{NBV}$} from the current location of the robot to the Next-Best-View is obtained by tracing back in the result of sub-block S2.2.

$$F(p) = \sum_{j=1}^{n} (u_j(p) - u_{j-1}(p)) \mu(A_j)$$

In the above formula, a sub-set j ⊂ F is defined as Aj={$F_m$, m∈N|$u_j(p) \le u_m(p) \le u_n(p)$}, μ is a normalized fuzzy metric function used for defining a weight of a group of features, and feature score vector sequences of the candidate points pare sorted in an ascending order according to normalized numerical values of the candidate points, that is, $0 = u_0(p) \le u_1(p) \le u_2(p) \le \ldots \le u_n(p) \le 1$.

At block S3, navigation is performed to the Next-Best-View along the global path R={$r_0, r_1, r_2, \ldots, p_{NBV}$} based on a local obstacle avoidance algorithm of a visual force field (VFF), which specifically includes the following sub-blocks.

At sub-block S3.1, if a current navigation target point is $r_0$, motion planning is performed in real time according to laser sensor data based on the VFF algorithm, and motion planning instructions are transmitted to the robot, so that the robot starts to move toward the current navigation target point $r_0$ until it reaches the point $r_0$.

At sub-block S3.2, if the robot reaches a critical point $r_i$ in the global path, let the current navigation target point be $r_{i+1}$. The motion planning is performed in real time based on the VFF algorithm, so that the robot continues moving to $r_{i+1}$ until it reaches the Next-Best-View $p_{NBV}$.

Figure 8:
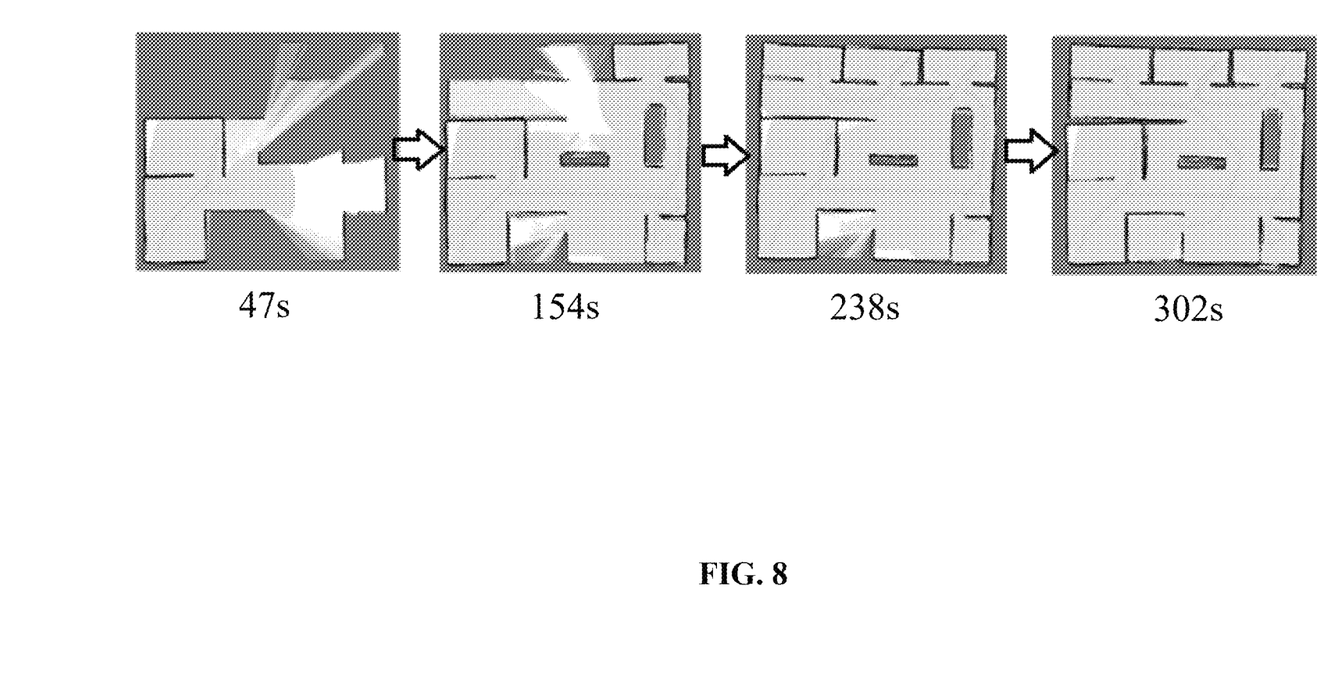
FIG. 8 is a schematic diagram illustrating an indoor autonomous robotic exploration process according to an example of the disclosure.

At sub-block S3.3, a return is made to block S1 to start to query the next Next-Best-View for the next stage of exploration. FIG. 8 is a schematic diagram illustrating a progress of an indoor environmental exploration task according to an example of the disclosure.

In the example, a method based on a reduced approximated generalized Voronoi graph is implemented. The reduced approximated generalized Voronoi graph may be regarded as a center line of the passable region in the map, and the topological map generated by the reduced approximated generalized Voronoi graph can express the connectivity and reachability of the entire passable region. Based on this, redundant edges and nodes are culled from the reduced approximated generalized Voronoi graph proposed in the example, so that the entire topological map can express almost same environmental information with a smaller number of edges and nodes. The leaf nodes of the reduced approximated generalized Voronoi graph may be taken as candidate frontiers, and the edges may be taken as an initial space of the path planning. Thus, the target number to be calculated is reduced, spatial complexity and time complexity of the algorithm are greatly lowered, and the functional, real-time and complete requirements of the indoor autonomous exploration of the mobile robot are satisfied.

It will be obvious to those skilled in the art that changes and modifications may be made, and therefore, the aim in the appended claims is to cover all such changes and modifications.

What is claimed is:

1. A method, comprising:
   1) constructing a reduced approximated generalized Voronoi topological map by means of a morphological method according to 1.1)-1.4):
      1.1) performing threshold extraction for an occupancy probabilistic grid map: extracting obstacle pixels with a gray scale smaller than an empirical threshold $th_{obstacle}$ as an obstacle region, the $th_{obstacle}$ being a value between 50-70; and extracting non-obstacle pixels with a gray scale greater than an empirical threshold $th_{free}$ as a passable region, and the $th_{free}$ being a value between 200-220;
      1.2) performing small-gap filling for the obstacle region and the passable region generated in 1.1) using a morphological closing operation; removing those pixel blocks with the number of pixels smaller than an empirical threshold $th_{conn}$ using connectivity analysis, in which the value of the $th_{conn}$ is determined according to the resolution of the occupancy probabilistic grid map; obtaining a smooth obstacle region and a smooth passable region by removing a convex part of the boundary of the pixel block using smoothing filtering;
      1.3) obtaining the reduced approximated generalized Voronoi diagram by performing center line extraction for the smooth passable region in 1.2) using an image thinning algorithm; and
      1.4) performing topologization for the reduced approximated generalized Voronoi graph obtained in 1.3), extracting a node set V in the reduced approximated generalized Voronoi graph by adopting a neighborhood analysis, obtaining edges E connecting these nodesbased on a flood-fill algorithm, and recording edge lengths in a distance matrix $M_{dist}$, to obtain a topological map $G=\{V, E, M_{dist}\}$ of the passable region;

2) obtaining a Next-Best-View and planning a global path from the robot to the Next-Best-View according to 2.1)-2.5):

2.1) obtaining an edge e closest to a current location of the robot in the topological map G and two nodes $v_e^1$ and $v_e^2$ of the e by taking all leaf nodes $V_{leaf}$ in the topological map G as initial candidate frontiers, and querying two paths $R_1=\{v_e^1, r_0^1, r_1^1, r_2^1, \ldots, p\}$ and $R_2=\{v_e^2, r_0^2, r_1^2, r_2^2, \ldots, p\}$ from each candidate point p to the $v_e^1$ and the $v_e^2$ respectively in the topological map based on a Dijkstra algorithm;

2.2) performing curve simplification for the two paths obtained in 2.1) based on a Douglas-Pucker algorithm, then calculating lengths of two simplified paths as $D(p, v_e^1)$ and $D(p, v_e^2)$ respectively, selecting a minimum value as a distance $D(p)=\min\{D(p, v_e^1), D(p, v_e^2)\}$ from the p to the robot, and calculating a sum $T(p)$ of turning angles of a path corresponding to the distance;

2.3) calculating an estimate $A(p)$ of a potential environmental information gain of each candidate point p in the occupancy probabilistic grid map, and calculating a perception degree $C(p)$ of a sensor of the candidate point;

2.4) performing normalization for four feature values $D(p)$, $T(p)$, $A(p)$ and $C(p)$ of the candidate point calculated in 2.2) and 2.3), obtaining a candidate point set $P_{candidate}$ by excluding the candidate points with extremely low scores based on a low threshold, and completing the exploration when the candidate point set is an empty set; and 2.5) evaluating each candidate point in the candidate point set $P_{candidate}$ by a Multi-Criteria-Decision-Making approach based on a fuzzy measure function, taking the candidate point with the highest score as the Next-Best-View $p_{NBV}$, and obtaining the global path $R=\{r_0, r_1, r_2, \ldots, p_{NBV}\}$ from the current location of the robot to the Next-Best-View by tracing back in the result of in 2.2); and 3) navigating to the Next-Best-View along the global path $R=\{r_0, r_1, r_2, \ldots, p_{NBV}\}$ based on a visual force field (VFF) algorithm according to 3.1)-3.3):

3.1) letting a current navigation target point be $r_0$, performing motion planning in real time according to laser sensor data based on the VFF algorithm, transmitting motion planning instructions to the robot, so that the robot starts to move toward the current navigation target point $r_0$ until the robot reaches $r_0$;

3.2) when the robot reaches a critical point $r_i$ in the global path, letting the current navigation target point be $r_{i+1}$, performing motion planning in real time based on the VFF algorithm, so that the robot continues moving to the $r_{i+1}$ until the robot reaches the Next-Best-View $p_{NBV}$; and 3.3) returning to 1), and starting to query the next Next-Best-View for the next stage of exploration;

wherein the sum $T(p)$ of the turning angles in 2.2) is calculated based on the following formula:

$$T(p) = \sum_{i=1}^{M-2} \theta_i$$

wherein:
$\theta_i = \pi - \angle D_{i-1}D_iD_{i+1}$, which refers to a degree of an i-th turning angle.

2. The method of claim 1, wherein the perception degree $C(p)$ of the sensor in 2.3) is calculated based on the following formulas:

$$x_{uc} = \operatorname{argmin}_{x \in UC} Dist(p, x),$$

$$x_c = \operatorname{argmin}_{x \in C} Dist(p, x), \text{ and}$$

$$C(p) = \begin{cases} -Dist(p, x_{uc}), & \text{if } p \in C \\ Dist(p, x_u), & \text{if } p \in UC \end{cases},$$

wherein:
a set UC refers to a region undetected by another sensor, a set C refers to a region already detected by another sensor, $x_{uc}$ refers to a pixel point that is closest to the candidate point p and undetected by another sensor, and $x_c$ refers to a point that is closest to the candidate point p and already detected by another sensor.

3. The method of claim 1, wherein the normalization in 2.4) is performed for the four feature values $D(p)$, $T(p)$, $A(p)$ and $C(p)$ of the candidate point based on the following formulas:

$$u_A(p) = \frac{A(p) - \min_{q \in CP} A(q)}{\max_{q \in CP} A(q) - \min_{q \in CP} A(q)},$$

$$u_D(p) = 1 - \frac{D(p) - \min_{q \in CP} D(q)}{\max_{q \in CP} D(q) - \min_{q \in CP} D(q)},$$

$$u_T(p) = 1 - \frac{T(p) - \min_{q \in CP} T(q)}{\max_{q \in CP} T(q) - \min_{q \in CP} T(q)} \text{ and}$$

$$u_C(p) = \frac{C(p) - \min_{q \in CP} C(q)}{\max_{q \in CP} C(q) - \min_{q \in CP} C(q)}.$$

4. The method of claim 1, where in 2.5), the calculation of the score of candidate point p involves the following formula:

$$F(p) = \sum_{j=1}^{n}(u_j(p) - u_{j-1}(p))\mu(A_j),$$

wherein:
a sub-set $Aj \subset F$ is defined as $Aj=\{F_m, m \in N | u_j(p) \leq u_m(p) \leq u_n(p)\}$, $\mu$ a normalized fuzzy metric function used for defining a weight of a group of features, and feature score vector sequences of the candidate points p are sorted in an ascending order according to normalized numerical values of the candidate points, that is, $0=u_0(p) \leq u_1(p) \leq u_2(p) \leq \ldots \leq u_n(p) \leq 1$.

* * * * *